Dec. 16, 1969      D. WOFSEY      3,484,667
EDDY CURRENT SEAM TRACKER AND SERVO CONTROL RESPONSIVE THERETO
Filed July 28, 1965      2 Sheets-Sheet 1
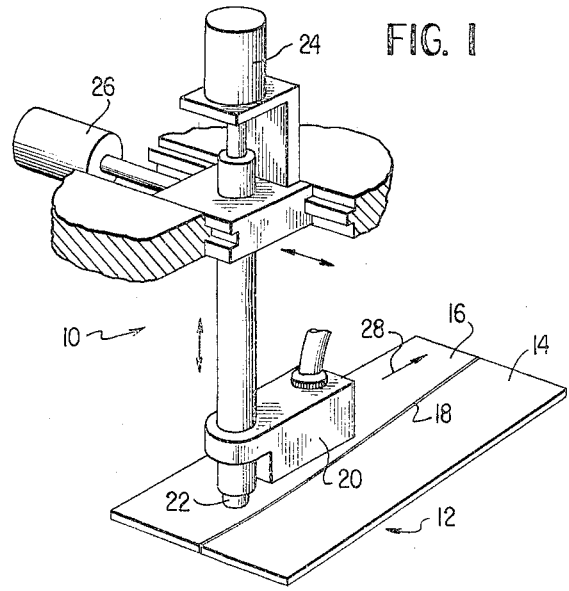
FIG. 1
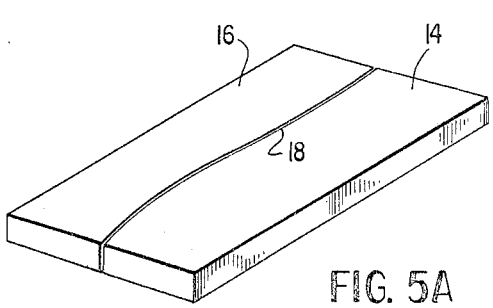
FIG. 5A
DEVIATION
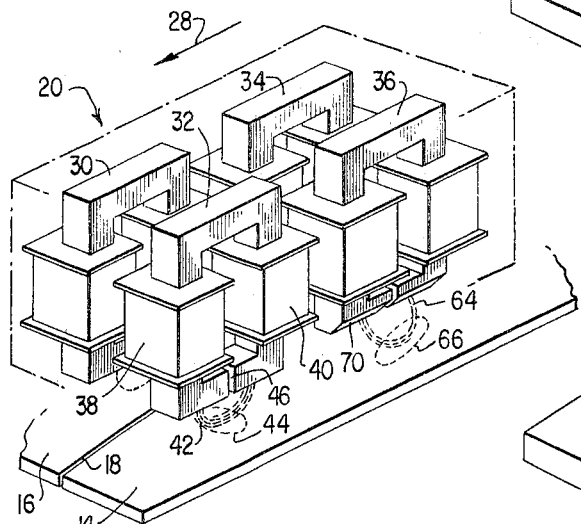
FIG. 2
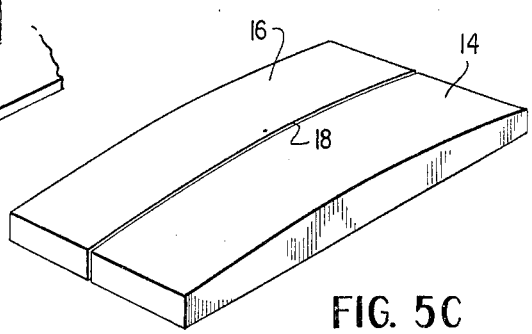
FIG. 5B
MISMATCH
FIG. 5C
PROXIMITY CHANGE
INVENTOR.
DAVID WOFSEY
BY      ATTORNEYS.

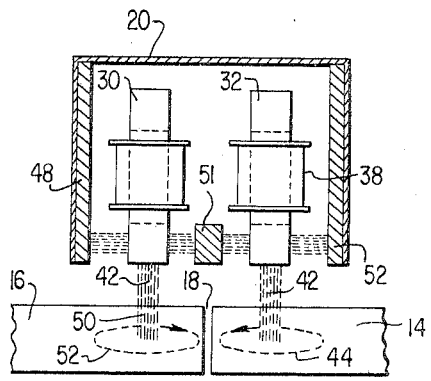
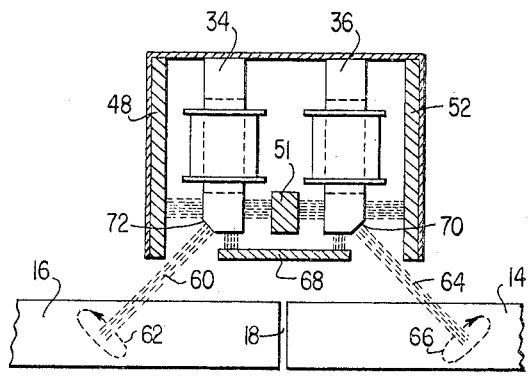
FIG. 3    FIG. 4
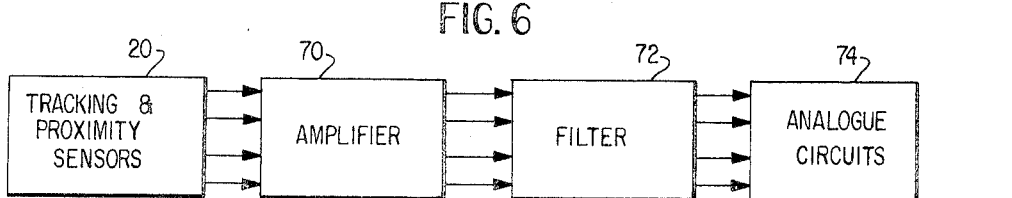
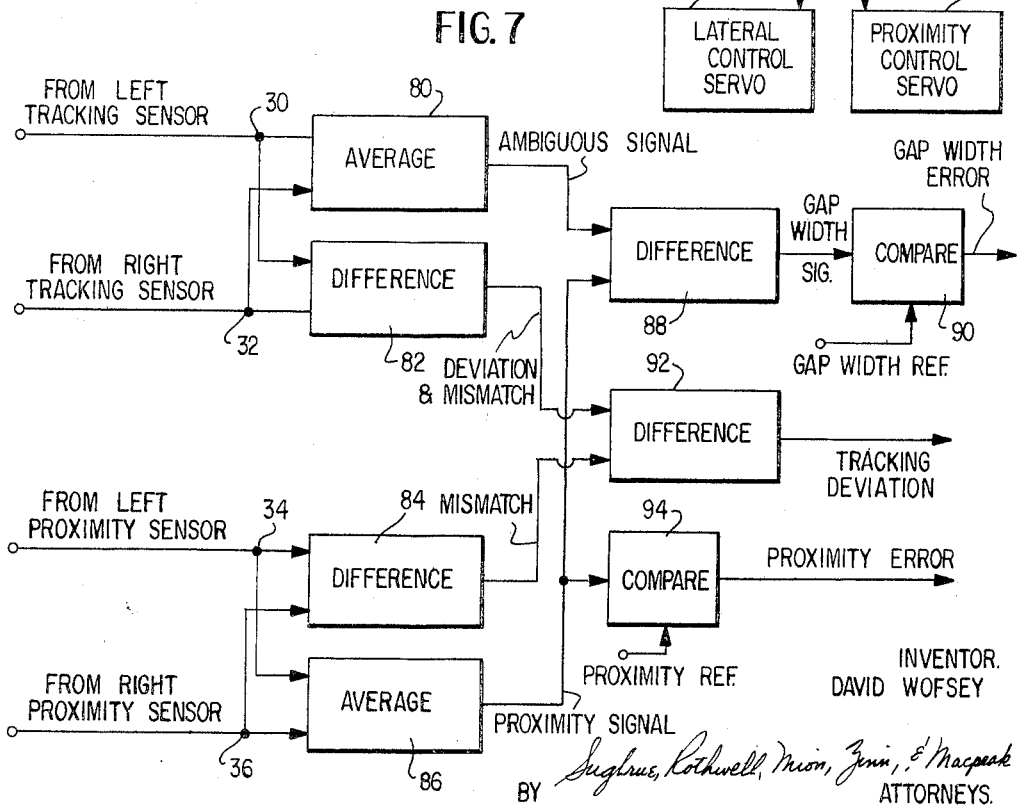

United States Patent Office 3,484,667
Patented Dec. 16, 1969

3,484,667
EDDY CURRENT SEAM TRACKER AND SERVO
CONTROL RESPONSIVE THERETO
David Wofsey, Denver, Colo., assignor to Martin-
Marietta Corporation, New York, N.Y., a corpo-
ration of Maryland
Filed July 28, 1965, Ser. No. 475,396
Int. Cl. G05b; H02p 1/54, 5/46, 7/68
U.S. Cl. 318—18                                      7 Claims

ABSTRACT OF THE DISCLOSURE

An automatic seam tracker for a welder for tracking a predetermined path along adjacent edges of electrical conductive members. Two pairs of magnetic cores generate eddy currents in the conductive members and sensors detect the flux generated by the eddy currents. One pair of magnetic cores direct flux normal to the surfaces to be welded to sense lateral seam deviation and seam width. The other pair direct flux at an angle to the surfaces to be welded to detect mismatch and proximity changes. Mismatch signals are subtracted from lateral deviation signals to prevent erroneous lateral deviation signals. The lateral deviation and proximity signals control servos for positioning a welding head and the seam width signal controls the wire feed rate to the welding head.

---

This invention relates to an automatic seam tracking mechanism and more particularly relates to an automatic seam tracker of the type which uses magnetic sensing.

Automatic seam trackers have particular use in the welding arts wherein it is desired to butt weld two plates together at their common junction, referred to as the seam. If the operation is to be automatic, a sensing means must be included in the system for the purpose of sensing the position of the seam and causing the welding head to thereby track or follow the seam.

One type of automatic tracking system known in the prior art includes a magnetic sensor, otherwise known as a transducer, which is positioned adjacent to the welding member and moves with it along the seam at a rate which is predetermined by the welding requirements. The sensor detects seam deviation and energizes a servo system which moves the welding head to the proper position with respect to the seam. For example, if the seam is off to the right or left of the welding head, the sensor detects this lateral deviation and correctly positions the welding head. Many prior art sensors are also capable of detecting proximity changes. A proximity change is a change in height of the two plates which are being welded, or more specifically a change in the distance between the welding head and the upper end of the seam.

In one type of prior art system the sensor includes two magnetic core members positioned so that one of them directs flux into the plate on the left side of the seam and the other one directs flux into the plate on the right side of the seam. Each magnetic core forms an independent magnetic circuit and causes eddy currents to be generated in the right and left plates respectively. The eddy currents generated in the two plates are restricted by the seam edge, and these currents in turn generate flux fields which tend to oppose the flux fields which produce them. The result of such a situation, which is well known in the art, is that the flux flowing through the individual magnetic core members of the sensor is dependent upon the restricted eddy currents. The flux is sensed by any well known means and the difference between the signal sensed from the first core and that sensed from the second core will be zero as long as the seam is centered between the two cores. If, however, there is any lateral deviation of the seam line, there will be a finite difference between the signals which are sensed, and the magnitude and polarity of the difference signal is an indication of the deviation of the seam line from the center and the direction of that deviation.

The eddy currents are also restricted by the upper and lower edges of the plates which are being welded. Therefore, the sensed signal will have a component which is an indication of the proximity of the individual plates. By adding two sensed signals and comparing the added signal with a locally generated reference, the overall seam proximity change will be detected and the welding head can be positioned in accordance therewith.

The prior art systems, such as that described above, suffer from the fact that they can only detect deviation and proximity errors and furthermore, they are not sensitive enough for use in an extremely high accuracy welding operation. One particular reason why the prior art systems have not been sensitive enough for use where extremely high accuracy is necessary is due to the possible plate mismatch or seam width change.

A mismatch occurs when one of the plates rises above the surface of the other plate. In such situations, if the sensors are highly sensitive the difference signal will be a finite value even though the seam is properly centered. Since the difference signal controls lateral movement of the welding head, the latter-described situation is undesirable. For example, the flux which flows through the left-hand magnetic core, and consequently the signal sensed therefrom, contains a component which is dependent upon the lateral deviation of the seam and also contains a component which is dependent upon the heights of the left plate. Furthermore, the flux flowing through the right-hand core and consequently the signal sensed therefrom contains one component which is dependent upon the lateral deviation of the seam and another component which is dependent upon the height of the right-hand plate. Therefore, even if the seam is exactly centered, the difference signal will be a finite value due to the plate mismatch.

Since the components of the two sensed signals which relate to plate height are much larger than the components which relate to seam deviation, the prior art systems have been able to overcome this problem only by lowering the sensitivity of the sensor. The result has been that mismatch will not cause an undesired lateral movement of the welding mechanism, but this advantage has been achieved at the cost of reduced sensitivity.

When the seam is properly centered, a deviation in the seam width will have no effect on the lateral movement of the welding mechanism due to the fact that the change in flux in both cores will be identical and therefore the difference signal will still be zero. However, the latter situation will have a detrimental effect on the proximity control servo. For example, if the width of the seam increases, the eddy currents at each f the plates will become more restricted thereby causing a change in the flux flowing through the individual cores. When the sensed signals are added and compared with the locally generated reference signal, the resulting comparison signal will indicate a proximity change and will act upon the vertical servo system to move the welding mechanism even though such vertical movement is undesirable.

The system of the present invention overcomes the above-described disadvantages and, due to its unique placement of a plurality of magnetic cores in the sensor, is capable of detecting lateral deviation, mismatch, proximity change, and seam width.

It is therefore an object of the present invention to provide a new and improved automatic sensor device having relatively high sensitivity as compared with the prior art seam sensors.

A further object of the present invention is to provide an automatic seam tracking sensor capable of detecting deviation, proximity, mismatch and/or seam width changes.

Another object of the present invention is to provide such a magnetic seam sensor which is particularly, although by no means exclusively, adapted to be used with an automatic welding mechanism.

The above objects are achieved in the present invention by a sensor which comprises a first pair of magnetic cores positioned on opposite sides of the seam and each of which directs flux into the plates in a direction which will induce eddy currents that are restricted primarily by the seam edge and only slightly by the upper and lower edges of the plates, and a second pair of magnetic cores positioned on opposite sides of the seam which direct magnetic flux into the respective plates at angles away from the seam line thereby generating eddy currents which are restricted only by the upper and lower plates and are unaffected by the seam edges. Due to the unique arrangement of the magnetic cores, the flux flowing through the first pair of cores is primarily dependent upon the seam position and only slightly dependent upon the plate height, and the flux flowing in the second pair of cores is almost entirely dependent upon the plate height while being independent of the seam position.

Other objects of the invention will be pointed out in the following description and claims and illustrated in the accompanying drawings, which disclose, by way of example, the principle of the invention and the best mode which has been contemplated for applying that principle.

In the drawings:

FIGURE 1 is a perspective view showing the relationship between the plates which are being welded, the welding head and the sensing mechanism;

FIGURE 2 is a perspective view of the placement of the magnetic cores inside the sensor box;

FIGURES 3 and 4 are sectional views of the sensor and plates shown in FIGURE 2;

FIGURES 5A through 5C are illustrative of certain welding plate errors which are detected by the sensor of the present invention;

FIGURE 6 is a block diagram of the system which connects the sensor outputs to the vertical and horizontal servos of the welding mechanism, and FIGURE 7 is a block diagram of one type of analog circuit capable of being used with the present invention.

Referring to FIGURE 1, the sensor 20 is shown attached to the welding mechanism 10 which includes a welding head 22, a vertical servo 24 and a horizontal servo 26. Servos 24 and 26 are controlled by the signals which are produced by sensor 20. The entire welding mechanism 10 moves, by means not shown but well known in the art, in a direction indicated by arrow 28 over the welding plates 12, which include a right-hand plate 14 and a left-hand plate 16. Welding plates 14 and 16 form a seam 18 at which the welding operation is to occur.

Some of the errors which occur in the welding plates and which are capable of being detected by the sensor of the present invention are shown in FIGURES 5A, 5B and 5C. When deviation exists such as shown in FIGURE 5A, the sensor must be capable of providing a signal which will control the horizontal servo 26 to position the welder directly above the seam center line. If a mismatch situation exists such as shown in FIGURE 5B, the sensor must be capable of generating a mismatch signal which will counteract the mismatch component of the deviation signal. Also, when a proximity change exists, such as shown in FIGURE 5C, the sensor must be capable of generating a signal which will control vertical movement of the welding mechanism to position the welding heat at the desired distance above the top of the seam.

In FIGURE 2, the sensor 20 is shown placed above seam 18 of plates 14 and 16. The sensor comprises magnetic cores 30, 32, 34 and 36 which are placed inside the box shown by dotted lines in FIGURE 2. Cores 30 and 32 comprise the tracking pair and cores 34 and 36 comprise the proximity pair. The right-hand tracking core 32 is a rectangular magnetic member fabricated from soft iron material and having an air gap 46 for the purpose of dispersing flux outside of the core proper. A coil 38 is placed around core 32 as shown and is connected to an oscillator, not shown, which energizes the coil to thereby provide a flow of flux throughout the core. Near the air gap 46, some of the flux flows out of one of the lower core pieces and into the adjacent core piece, exiting and entering the core at angles perpendicular to the core members as is well known in the art. A portion of the flux, hereafter referred to as the primary flux, flows into plate 14 as indicated by arrow 42.

FIGURE 3 indicates that the flux also leaves the other surfaces of core member 32 but only the primary flux 42 from the bottom surface of core 32 flows into plate 14 causing eddy currents 44 to be generated. Likewise, primary flux 50 from core 30 flows into plate 16 causing eddy currents 52 to be generated. Magnetic shields 48, 51 and 52 may be provided inside the sensor housing or box for blocking the external magnetic flux which escapes from other than the bottom surfaces of cores 30 and 32. It can be seen from FIGURES 2 and 3 that the primary flux which flows into the welding plates flows in a direction parallel to seam 18 and thereby generates eddy currents in the directions indicated by arrows 44 and 52.

The eddy currents which are generated are restricted primarily by the plate edges which form seam 18. However, these eddy currents are also restricted to a small extent by the upper and lower edges of the plates 14 and 16.

Each of the cores also contains a sensing coil, indicated by numeral 40 on core 32, which is well known in the art and is adapted to sense the flux flowing through the core and provide an A.C. voltage across the sensor coil terminals that is proportional to the flux. Therefore, each of the magnetic cores 30 and 32 provides an output signal which is an A.C. voltage whose magnitude is dependent upon the magnitude of the flux flowing in the individual core member. Since eddy currents 44 and 52 generate flux fields which tend to oppose the magnetic core flux fields, and further, since the eddy currents themselves are restricted by the plate edges and to a small extent by the plate height, the total flux flowing throughout the individual cores will be dependent upon the seam position and the plate heights. For example, the signal output from the sensing coil of core 32 is represented by the expression, $S_{32} \propto Ad_r Bh_r$; wherein $S_{32}$ is the magnitude of the voltage supplied by the sensing coil attached to core 32, $A$ and $B$ are constants wherein $A \gg B$, $d_r$ is the horizontal distance from the edge of right plate 14 which forms seam 18, and $h_r$ is the component which depends upon the vertical distance between the sensor and the top surface height of the right plate 14. The output signal from core 30, which is the left-hand core of the tracking pair, is similarly given by, $S_{30} \propto Ad_1 + Bh_1$.

Cores 30 and 32 may be driven by the same oscillator and a balancing mechanism may be provided to initially balance the sensed signals from them so that their difference is equal to zero when the sensor is directly centered on the seam and no mismatch exists. It can be seen that if no mismatch exists the difference between $S_{32}$ and $S_{30}$ will be an indication of the magnitude and direction of the sensor offset from the seam center line. However, if a mismatch occurs $Bh_r$ will be different than $Bh_1$ and therefore the difference between $S_{32}$ and $S_{30}$ will contain a component which is an indication of mismatch and not an indication of deviation. If the difference signal were fed directly to the horizontal servo 26 to control lateral movement of the mechanism, lateral movement would take place when a mismatch occurs even though a deviation error does not exist. It therefore becomes necessary to eliminate the mismatch component from the difference signal, and this is accomplished in the present system by means of proximity pair magnetic cores 34 and 36 without the need for lowering the overall sensitivity of the system.

The proximity pair comprises magnetic cores 34 and 36 shown in FIGURES 2 and 4. These cores are also provided with driving coils and sensing coils similar to those associated with the tracking pair. The driving coils may be energized by the same oscillator which supplies the driving coils of core members 30 and 32, although it will be understood by those skilled in the art that a separate oscillator may be provided if desired. Cores 34 and 36 are substantially identical to cores 30 and 32 with the important exception that the bottom edges of the former are partially beveled to form angled surfaces 70 and 72. Since the flux near the air gap leaves the surfaces in a direction which is perpendicular to the surface, a portion of the flux from each of the cores 34 and 36 will be directed towards the plates 14 and 16 at angles away from the seam line 18. For example, angled surface 70 of magnetic core 36 directs flux 64 at an angle away from seam line 18, and angled surface 72 of magnetic core 34 directs flux 60 into the left-hand plate 16 at an angle away from the center line 18. Fluxes 60 and 63 are the respective principal fluxes created by cores 34 and 36. It will be noted that in FIGURE 4 an additional shielding member 68 is placed beneath the bottom surfaces of core members 34 and 36. The purpose of shield 68 is to prevent flux from being directed into plates 14 and 16 in a manner which is identical to that shown in FIGURE 3.

Magnetic fluxes 60 and 64 induce eddy currents 62 and 66, respectively, which are restricted only by the upper and lower surfaces of the plates 14 and 16, and are not at all restricted by the seam edges of the plates. The fluxes flowing in the individual cores 34 and 36, and consequently the voltage signals generated by their sensing coils, will contain components which are dependent upon the height of the individual plates, but will contain no components which are dependent upon the position of the seam edge. Therefore, the difference between the signals sensed by cores 34 and 36 will be a measure of mismatch, hereafter referred to as the mismatch signal, and the sum of the signals sensed by cores 34 and 36 will be a measure of the height of the seam center line, hereafter called the proximity signal. If the mismatch signal is subtracted from the difference signal generated by the tracking pair, the resulting signal output will be a pure lateral deviation signal and may be fed to the horizontal servo mechanism to control lateral positioning of the welding mechanism. Also, the sum of the signals sensed by the proximity pair may be compared to a locally generated reference signal whose value is indicative of the desired height of the welding mechanism above the seam center line, for the purpose of controlling the vertical servo which positions the welding mechanism at the proper distance above the center line.

An additional feature of the invention resides in the use of the sensed signals to control the wire feed rate. It is well known to those skilled in the art that in welding systems a welding material, which is usually in the form of a rod or wire, must be fed to the point at which welding occurs. It is obvious that if no special controls are used the rate at which the wire is fed to the point of the weld will be constant. However, for optimum results, more wire should be fed to the point of the weld when the seam gap or width is wider than expected, and conversely less wire should be fed to the point of the weld when the seam gap or width is smaller than expected. Therefore, it may be desirable to control the rate of wire feed in accordance with the width of the seam.

In the sensor of the present invention no additional magnetic circuits are needed to control wire feed rate since the signals sensed by the tracking pair and the proximity pair are sufficient to form a seam gap control signal. For example, it was stated above that the sum of the sensed signals from the tracking pair is an indication of the plate proximity, i.e., the distance of the upper surface of the plates from the welding head and sensor. That statement is not entirely accurate because it can be seen by looking at FIGURES 2 and 3 that even though there is no lateral deviation of the seam center line and there is no proximity change, the sum of the signals from the tracking pair may vary in accordance with the seam width. This is due to the fact that the eddy currents generated by the flux from the tracking pair is restricted by the plate seam edges. If the seam gap width decreases, the eddy currents become more restricted resulting in a change in the flux flowing through the tracking pair and consequently resulting in a variation in the sum of the tracking pair output signals. Therefore, the sum signal from the tracking pair is an ambiguous signal since it contains components which are dependent upon proximity and seam gap width. In order to provide a signal which is dependent only upon the seam gap width, the output signal from the proximity pair, which is a pure proximity signal, may be subtracted from the ambiguous signal, thus resulting in a signal whose amplitude varies only with a change in the seam gap width. The latter generated signal can be used to control the rate of the wire feed mechanism.

In FIGURE 6 there is shown a simple block diagram of the interconnecting system. It should be understood that the block diagrams of both FIGURES 6 and 7 are shown only by way of example to illustrate one possible method of utilizing the sensed signals to control the servo mechanisms which in turn position the welding head. It should also be understood that circuits which perform the functions of the individual building blocks of FIGURES 6 and 7 are well known in the art and it is deemed unnecessary and cumbersome to show detailed circuitry in the present application.

In FIGURE 6 the four outputs from the sensor 20, one output for each core member, are fed through an amplifier 70 and a filter 72 to the analog circuits 74. The analog circuits 74 operate upon the sensed signals to form the proper control signals for controlling the lateral or horizontal servo 26 and the proximity or vertical servo 24. As explained above, the analog circuits 74 may also operate upon the sensed signals to provide an additional control signal for controlling the wire feed rate.

One type of analog circuit which may be used to operate upon the sensed signals for generating the proper control signals is shown in FIGURE 7. The signal from the left tracking sensor, which is core 30 as shown in FIGURE 2, is applied as one input to an averaging circuit 80 and also as one input to a difference circuit 82. The signal from the right tracking sensor, shown as core 32 in FIGURE 2, is applied to the second inputs of the averaging circiut 80 and the difference circuit 82. The output of averaging circuit 80 is an ambiguous signal which contain components of proximity and seam gap width as described above. It should be noted that instead of using an averaging circuit, a summing circuit could be used with the same result, however, the locally generated reference signals would have to be of a higher magnitude for proper comparison with the summed signals. The output from the difference circuit 82 is a signal which is largely dependent upon seam center line deviation, but is also dependent upon plate mismatch. The signals sensed from left proximity sensor 34 and right proximity sensor 36 are subtracted in a difference circuit 84 resulting in a mismatch signal, and are averaged in the averaging circuit 86 resulting in a proximity signal. Averaging circuit 86 may also be a summing circuit.

The proximity signal output from averaging circuit 86 and the ambiguous signal output from averaging circuit 80 are subtracted in a difference circuit 88 whose output is a signal having an amplitude dependent upon the seam gap width. This signal is compared with a seam gap width reference signal in comparator 90, the output of which is a gap width error signal which may be used to control the wire feed rate.

The proximity signal output from averaging circuit 86 is compared in component 94 with a locally generated proximity reference signal. The output from comparator 94 is a proximity error control signal which is used to control the proximity servo 24. The mismatch signal from difference circuit 84 is subtracted from the deviation plus mismatch signal in difference circuit 92 resulting in a pure deviation signal. The deviation output from difference circuit 92 is used to control the lateral servo 26 which horizontally positions the welding mechanism.

From the above description of the drawings it is apparent that this invention provides a new and improved sensor mechanism which has particular utility in an automatic welding environment and which is capable of providing signals which may be used to control vertical and horizontal movement of a welding head with high resolution due to its increased sensitivity. A pair of tracking sensors and a pair of proximity sensors, each of which is an individual magnetic core member with a driving coil and a sensing coil, are partially shielded for the purpose of directing magnetic flux into plates which are being butt welded, and sense errors in the plate alignment due to lateral deviation, mismatch, gap width, and proximity changes.

While there have been shown and described and pointed out the fundamental novel features of the invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. An apparatus for tracking a predetermined path along adjacent edges of electrical conductive members and controlling an element to move along the path comprising:
    (a) means associated with the element for sensing lateral deviation of the element from the path including first means for generating first eddy currents in each of the conductive members oriented perpendicular to the edge thereof whereby the resistivity of said first eddy currents is primarily dependent upon the lateral position of the element with respect to the adjacent edges of the electrical conductive members;
    (b) means for generating first sensing signals indicating the resistivity of said first eddy currents;
    (c) means for comparing said first sensing signals and generating a lateral error signal indicating a lateral position error of the element with respect to the adjacent edges of the electrical conductive members;
    (d) means responsive to said lateral error signal for driving the element until said lateral position error is corrected;
    (e) means for sensing the lateral spacing between the adjacent edges of the electrical conductive members and providing a lateral spacing signal when the lateral spacing exceeds a predetermined amount; and
    (f) means responsive to the lateral spacing signal for controlling an operation of the element.

2. An apparatus for tracking a predetermined path along adjacent edges of electrical conductive members and controlling an element along the path comprising:
    (a) means associated with the element for sensing lateral deviation of the element from the path including first means for generating first eddy currents in each of the conductive members oriented perpendicular to the edge thereof whereby the resistivity of said first eddy currents is primarily dependent upon the lateral position of the element with respect to the adjacent edges of the electrical conductive members;
    (b) means for generating first sensing signals indicating the resistivity of said first eddy currents;
    (c) means for comparing said first sensing signals and generating a lateral error signal indicating a lateral position error of the element with respect to the adjacent edges of the electrical conductive members;
    (d) means associated with the element for sensing the proximity of the element to each of the electrical conductive members including second means for generating second eddy currents in each of the conductive members oriented at an acute angle to the edge thereof whereby the resistivity of the second eddy currents is dependent only upon the proximity of the element to each of the electrical conductive members;
    (e) means for generating second sensing signals indicating the resistivity of said second eddy currents;
    (f) means for comparing said second sensing signals and generating a mismatch signal indicating proximity mismatch of the electrical conductive members with respect to the element;
    (g) means for subtracting said mismatch signal from said lateral error signal to provide a corrected lateral error signal indicative solely of lateral position error of the element with respect to the adjacent edges of the electrical conductive members; and
    (h) means responsive to said corrected lateral error signal for driving the element until said lateral position error is corrected.

3. Apparatus as claimed in claim 2, including:
    (a) means for sensing the lateral spacing between the adjacent edges of the electrical conductive members and providing a lateral spacing signal when the lateral spacing exceeds a predetermined amount; and
    (b) means responsive to the lateral spacing signal for controlling and operation of the element.

4. Apparatus as claimed in claim 2 including:
    (a) means for averaging said second sensing signals to generate an average proximity signal;
    (b) means for comparing said average proximity signal to a reference to generate a proximity error, signal indicating a proximity position error of the element with respect to the electrical conductive members; and
    (c) means responsive to said proximity error signal for driving the element until the proximity position error is corrected.

5. Apparatus as claimed in claim 4, in which said first means for generating said fist eddy currents comprises a first plurality of magnetic cores, at least one magnetic core on each side of the path, for directing magnetic flux into the electrical conductive members parallel to the adjacent edges thereof and in which said second means for generating said second eddy currents comprises a second plurality of magnetic cores, at least one magnetic core on each side of the path, for directing magnetic flux into the electrical conductive members at an acuate angle with respect to the adjacent edges thereof.

6. Apparatus as claimed in claim 5, in which said means for generating said first and second sensing signals comprises sensing coils for sensing the mtgnetic flux in said first and second pluralities of magnetic cores.

7. An apparatus for tracking a path defined by opposing surfaces of a pair of plate members and for controlling an element to move along the path comprising means for sensing drift of the element relative to the path and providing a signal proportional to the drift for operating a drift drive means for the element to correct the drift, means for sensing the proximity of the element from the path and providing a signal proportional to a deviation in a predetermined proximity of the element for operating a proximity drive means for the element, means for sensing the width of the path and providing a signal proportional to a deviation in width of the path from a predetermined width, and means responsive to the signal indicating a deviation in the path width for controlling an operation of the element.

References Cited

UNITED STATES PATENTS

| | | | |
|---|---|---|---|
| 2,971,079 | 2/1961 | Sommeria | 219—125 |
| 3,359,486 | 12/1967 | Brosious | 219—125 X |

THOMAS E. LYNCH, Primary Examiner

U.S. Cl. X.R.

219—125